Patented Jan. 18, 1938

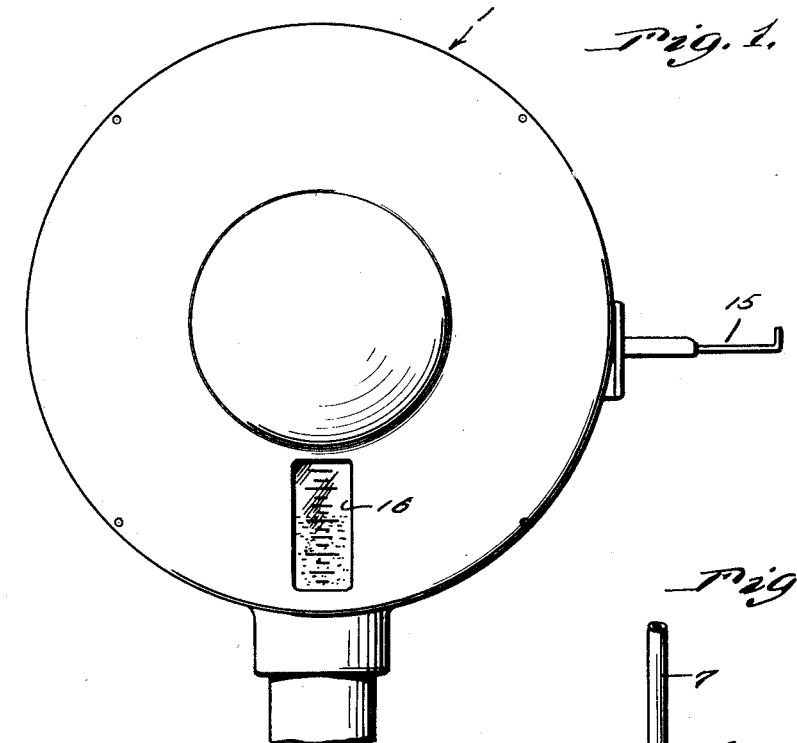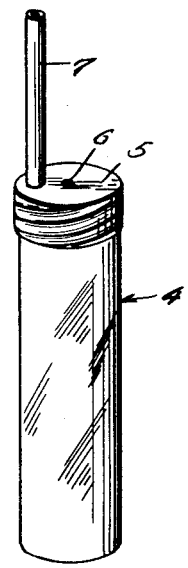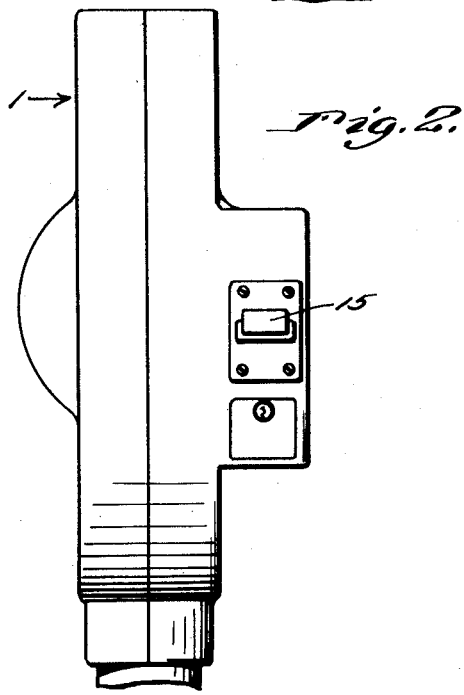

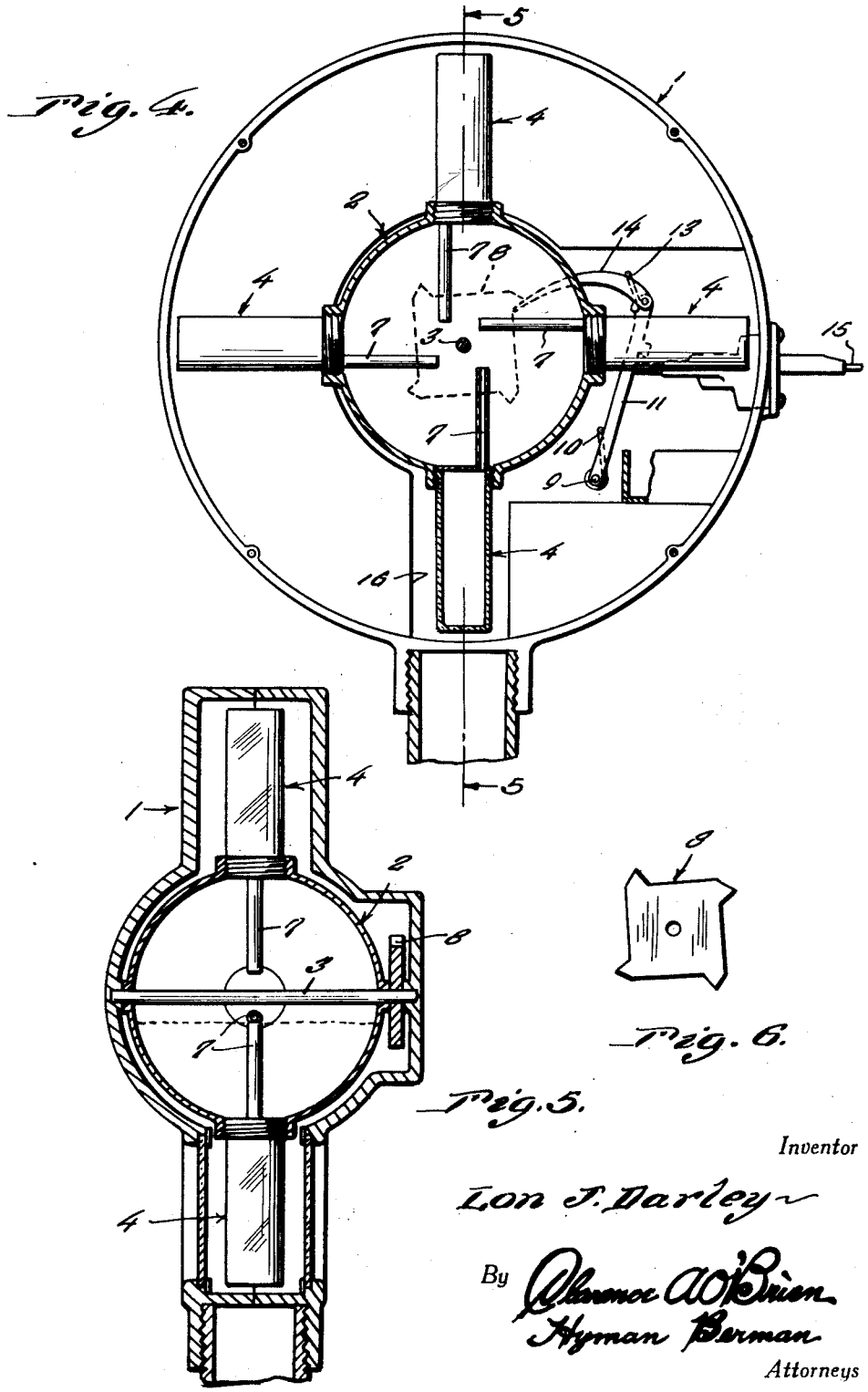

2,105,970

UNITED STATES PATENT OFFICE 2,105,970

PARKING METER

Lon J. Darley, Jackson, Miss., assignor, by mesne assignments, to Gravity Meter Corporation, a corporation of Delaware Application November 3, 1936, Serial No. 109,031

15 Claims. (Cl. 161—15)

This invention is an improvement in so-called parking meters used to regulate the time of automobile parking in congested parking areas in cities and municipalities wherein the time in which a vehicle may be parked on the street is subject to the payment of a small fee by the owner of the vehicle. One object of the invention is to provide a simple and reliable meter whereby the time in which the vehicle has been parked can be regulated, and if the owner overstays the time of parking such fact can be readily detected and he may be fined accordingly.

A further object is to provide a meter of such construction that in event an owner parks his vehicle by the meter but does not remain the full time for which he has paid another owner cannot take advantage of the unexpired time by driving in and attempting to park for the remainder of the unexpired time without paying.

Another object is to provide a meter of such nature that each time the meter is set by a successive parker it will be set for the full time allowed by the meter, and each parker will have his time neither prolonged nor shortened by the fact that the preceding parker did not use all of his time.

In the preferred form of my invention I provide a plurality of gravitative time-measuring devices which are successively brought into operative position; and at each setting of the meter the preceding time-measuring device is moved out of the way and a fresh time-measuring device positioned for use.

In my invention I do not employ electrical or clock mechanisms but do employ gravitative time-measuring devices by which the time is determined by the rate of flow of a fluid or of a fine sand, such as employed in hour glasses, into (or out of) the receptacle; and another object of my invention is to provide a construction whereby each receptacle will be entirely emptied (or filled) between the time it is moved out of operative or sight position and the time when it is again returned to such position, so that each receptacle will properly and fully indicate or measure a predetermined lapse of time; and each will measure the same lapse of time when brought to operative position.

Another object of my invention is to provide a simple, efficient, and low cost parking meter of this character.

The accompanying drawings illustrate one embodiment of my invention and I will describe the same with reference to said drawings and set forth in the claims the essentials of the invention and novel features of construction and novel combination of parts for which protection is desired.

In said drawings:

Fig. 1 is a side view of the parking meter with its coin slide projected.

Fig. 2 is a side view of Fig. 1.

Fig. 3 is a perspective view of one of the time-measuring receptacles detached.

Fig. 4 is a front view of the meter with the outside cover removed and interior parts in section.

Fig. 5 is a transverse vertical sectional view taken approximately on the line 5—5, Fig. 4, and looking in the direction of the arrows.

Fig. 6 is a detail view of the ratchet wheel.

The embodiment of the invention illustrated comprises a covering or housing 1 which may be made of any desirable material and in any desirable shape.

In the housing 1 is a container 2, which may be globular, spherical or cylindrical, and is mounted upon a shaft 3 disposed centrally of the housing and having bearings in the end walls of the housing. Preferably detachably attached to the periphery of the container 2 are a plurality of timing devices each comprising a receptacle 4, preferably of glass, having a closed outer end, and its inner end is closed by an externally threaded cap 5, preferably made of metal, and screwed into an opening in the periphery of the container (Figs. 4 and 5). In the meter shown I employ four such timing devices spaced 90° apart. The cap 5 is provided with a small aperture 6 which communicates with the interior of the container; and is also provided with an inwardly extending tube 7 which when the receptacle 4 is in lowermost position should extend above the level of the sand, mercury or other suitable flowable material, in the container. The amount of such material placed in the container should be more than sufficient to fill one of the receptacles 4.

In the construction shown the lowermost receptacle 4, in the position shown in Fig. 4, will be empty when first brought to this position, but it immediately begins to be filled with the sand or other material entering through the aperture 6 in the inner end 5' of the receptacle; but the tube 7 however is sufficiently long to prevent any material entering the receptacle through such tube when in such position.

The housing is shown as provided in its front and rear walls (at a point adjacent the lowermost receptacle 4) with sight openings 16, which may be covered by glass or other transparent plates (Figs. 1 and 5). The receptacles 4, of the glass plates in openings 16, may be sealed, as indicated in Fig. 1. Such scale may be marked or printed, so that the condition of the lowermost receptacle 4, i. e., whether empty or partially or wholly filled can be readily seen from either side of the housing.

I provide coin-controlled mechanism to permit the container and receptacles connected therewith to be partially rotated when the meter is to be set; so as to remove from the position opposite the sight opening the receptacle previously displayed there, and move into position another receptacle.

In the construction shown the container is rotated anti-clockwise, and the receptacles or timing devices will also move therewith in an anti-clockwise orbit. In the construction shown a ratchet 8 having four equally spaced teeth (one for each receptacle and 90° apart) is attached to the shaft 3. This ratchet is engaged by a pawl 14 pivotally connected at 12 to the upper end of a lever 11, the pawl being normally held in engagement with the ratchet 8 by a spring 13. The lever 11 is pivoted at its lower end on a pin or bolt 9 on the adjacent wall of the container and out of the path of movement of the receptacles. Lever 11 is normally pressed outward by a spring 10 into position to hold the pawl 14 retracted (Fig. 4).

The lever 11 can be pulled inward by a slide 15, of a coin-controlled mechanism such as is used on pin games and other coin-operated machines.

*Operation*

One of the receptacles 4 will always be opposite the sight opening 16, and the pawl 14 will be normally retracted as indicated in Fig. 4. When a car owner desires to use the meter he will deposit a coin in the coin chute which will permit him to push slide 15 inward, and the slide will force lever 11 to move pawl 14 inward and the pawl engaging ratchet 8 will turn the container and attached receptacle one-quarter revolution (when the meter contains four receptacles as shown). This moves the receptacle which was lowermost at the beginning of the operation out of the way, and brings a fresh container into operative position at the sight opening. The hour glass sand, or other suitable flowable measuring material, in the container 2 will then begin to pour into such receptacle through the small aperture 6 in the inner end thereof, and will continue to do so for a definite predetermined time, based upon the period of time required to fill the receptacle. If the parker should overstay his time and the receptacle fill such overtime can be readily detected by merely glancing at the receptacle through the sight opening. If the parker returns at the end of his time and wishes to stay longer he can put in another coin and repeat the operation, and stay for another period. If he should wish to leave before his time expires he is free to do so, but if the next parker should attempt to use any unexpired part of the previous parker's time and should not reset the meter he could be detected. If another parker comes up and puts in a coin and operates the slide as described a fresh timing device will be brought opposite the sight opening and he can remain the full length of time permitted.

When a used receptacle, filled or only partly filled, is moved away from the sight opening the sand or material therein begins to flow back into the container 2. While resting in a horizontal position, or in a vertical position at the top of the housing 2, all of the sand or other measuring substance will drain from the receptacle 4 back into the container through the tube 7 and perforation 6, and the tube 7 should be of such size that the receptacle will be entirely emptied when at the top of the housing.

While four receptacles are shown in the construction illustrated, a less or greater number might be employed. It is essential however that during the movement of the receptacle from operative position into and out of operative position it shall be entirely emptied before it again comes to operative position, so that each receptacle coming to operative position will be in condition to accurately and properly indicate the elapsed time by the flow of material thereinto.

I have shown and described one embodiment of my invention, but I do not desire to limit the invention thereto, and any change or changes may be made in the materials, and in the structure and arrangement of the parts, within the spirit of the invention and the scope of the subjoined claims.

I claim:—

1. In a parking meter, a housing having a sight opening, a hollow member rotatably mounted in the housing, a plurality of receptacles carried by said member, a gravitative flowable material in said member, means whereby each said receptacle receives a charge of such material from said member while at the sight opening, and discharges such material back into the member during the next revolution of the member, and means whereby said member may be rotated to move the receptacles successively from and to the sight opening.

2. A parking meter comprising a housing, a container for gravitative material rotatably mounted in the housing, a plurality of receptacles on said container; means for rotating the container; a gravitative material in said container; means whereby each said receptacle receives a charge of gravitative material from the container while in operative position to measure time by the inflow of such material, and means whereby each receptacle after leaving the operative position will discharge the material therein into the container before the receptacle is again moved to operative position.

3. In a parking meter, a support, a container rotatably mounted on said support; a supply of flowable gravitative material in said container, a plurality of receptacles mounted on said container, each receptacle having an aperture to permit the receptacle to be filled with material at a predetermined rate when the receptacle is in one position and adapted to discharge the flowable material therein back into the supply in the interval of time during which the receptacle is being moved from operative position back to operative position; and means whereby the container may be rotated to intermittently move the receptacles successively into and out of operative position.

4. In a parking meter, a housing having a sight opening, a container rotatably mounted in said housing and containing a supply of flowable gravitative material; a plurality of receptacles connected with said container and movable therewith, each said receptacle having an aperture communicating with the container and adapted when brought opposite the sight opening to be filled with material from the container at a predetermined rate, each said receptacle being also provided with means whereby the flowable material therein can be discharged back into the container in the interval between moving such receptacle away from the sight opening and the time it is returned thereto; and means whereby the container may be intermittently turned to move the receptacles.

5. In a parking meter, a housing having a sight opening, a movable container mounted in said housing and containing a supply of flowable gravitative material, a plurality of receptacles connected with said container, each said receptacle movable therewith and having an aperture communicating with the container to permit the receptacle when brought opposite the sight opening to be filled with material from the container at a predetermined rate, each said receptacle also being provided with means whereby the flowable material contained therein will be discharged back into the container after the receptacle is removed from operative position and before it is returned to operative position, and coin-controlled means whereby the container may be intermittently turned to move the receptacles to and from operative position.

6. In a parking meter, a housing having a sight opening, a movable container mounted in said housing containing a supply of flowable gravitative material, a plurality of receptacles connected with said container and movable therewith, each said receptacle having an aperture communicating with the container to permit the receptacle when brought opposite the sight opening to be filled with material from the container at a predetermined rate, each said receptacle having a tube on its inner end projecting into the container and above the level of the flowable material therein when the receptacle is in operative position, said tube permitting the material to be discharged back into the container when the receptacle is removed from operative position and before it is returned to operative position.

7. In a parking meter, a housing having a sight opening, a container rotatably mounted in said housing and containing a supply of flowable gravitative material, a plurality of receptacles connected with said container and movable therewith in an orbit, each receptacle having an aperture communicating with the container to permit the receptacle when brought opposite the sight opening to be filled with material from the container at a predetermined rate, each receptacle also being provided with means whereby the flowable material contained therein will be discharged back into the container after the receptacle is removed from operative position and before it is returned to operative position; and coin-controlled means whereby the container may be intermittently turned to bring the receptacles successively into operative position.

8. In a parking meter, a housing having a sight opening, a container rotatably mounted in said housing and containing a supply of flowable gravitative material, a plurality of receptacles connected with said container and movable therewith in an orbit, each said receptacle having an aperture communicating with the container to permit the receptacle when brought opposite the sight opening to be filled with material from the container at a predetermined time rate, each said receptacle also having a tube on its inner end projecting into the container and above the level of the flowable material therein when the receptacle is in operative position, said tube permitting the material to be discharged back into the container after the receptacle is removed from operative position and before it is returned to operative position; and coin-controlled means whereby the container may be intermittently turned to bring the receptacles into and out of operative position.

9. In a parking meter, a support; a hollow member rotatably mounted on the support; a plurality of receptacles carried by said member; a gravitative flowable material in said member; means whereby each said receptacle receives a charge of such material from said member while in operative position, and discharges such material back into the member during the next revolution of the member; and means on the support whereby said member may be rotated to move the receptacles successively into operative position.

10. A parking meter comprising a support, a rotatable container for flowable gravitative material, a plurality of receptacles on the container; means for rotating the container; a gravitative material in said container; means whereby each said receptacle receives a charge of gravitative material from the container when in operative position to thereby measure time by the inflow of such material; and means whereby each said receptacle after leaving the operative position will discharge the material therein into the container before the receptacle is again moved to operative position.

11. In a parking meter, a support; a container rotatably mounted on said support and containing a supply of flowable gravitative material; a plurality of receptacles connected with said container and movable therewith, each said receptacle having an aperture communicating with the container and adapted when brought into operative position to be filled with material from the container at a predetermined rate, each said receptacle being also provided with means whereby the flowable material therein can be discharged back into the container in the interval between moving such receptacle out of operative position and the time it is returned thereto; and means whereby the container may be intermittently turned to move the receptacles.

12. In a parking meter, a support; a movable container mounted on said support and containing a supply of flowable gravitative material, a plurality of receptacles connected with said container and movable therewith, each said receptacle having an aperture communicating with the container to permit the receptacle when brought into operative position to be filled with material from the container at a predetermined rate, each said receptacle also being provided with means whereby the flowable material contained therein will be discharged back into the container after the receptacle is removed from operative position and before it is returned to operative position, and coin-controlled means on the support whereby the container may be intermittently turned to move the receptacles to and from operative position.

13. In a parking meter, a support, a movable container mounted on said support containing a supply of flowable gravitative material, a plurality of receptacles connected with said container and movable therewith, each said receptacle having an aperture communicating with the container to permit the receptacle when brought into operative position to be filled with material from the container at a predetermined rate, each said receptacle having a tube on its inner end projecting into the container and above the level of the flowable material therein when the receptacle is in operative position, said tube permitting the material to be discharged back into the container when the receptacle is removed from operative position and before it is returned to operative position; and means for moving the container.

14. In a parking meter, a support; a container rotatably mounted on said support and containing a supply of flowable gravitative material, a plurality of receptacles connected with said container and movable therewith in an orbit, each said receptacle having an aperture communicating with the container to permit the receptacle when brought into operative position to be filled with material from the container at a predetermined rate, each said receptacle also being provided with means whereby the flowable material contained therein will be discharged back into the container after the receptacle is removed from operative position and before it is returned to operative position; and coin-controlled means on the support whereby the container may be intermittently turned to bring the receptacles successively into operative position.

15. In a parking meter, a support, a container rotatably mounted on said support and containing a supply of flowable gravitative material, a plurality of receptacles connected with said container and movable therewith in an orbit, each said receptacle having an aperture communicating with the container to permit the receptacle when brought into operative position to be filled with material from the container at a predetermined rate, each said receptacle also having a tube on its inner end projecting into the container and above the level of the flowable material therein when the receptacle is in operative position, said tube permitting the material to be discharged back into the container after the receptacle is removed from operative position and before it is returned to operative position; and coin-controlled means whereby the container may be intermittently turned to bring the receptacles into and out of operative position.

LON J. DARLEY.